United States Patent
Alshammari

(10) Patent No.: US 9,301,512 B2
(45) Date of Patent: Apr. 5, 2016

(54) FISHING CAPSULES

(71) Applicant: Taref Moneif Alshammari, Seattle, WA (US)

(72) Inventor: Taref Moneif Alshammari, Seattle, WA (US)

(*) Notice: Subject to any disclaimer, the term of this patent is extended or adjusted under 35 U.S.C. 154(b) by 219 days.

(21) Appl. No.: 14/144,072

(22) Filed: Dec. 30, 2013

(65) Prior Publication Data

US 2015/0181847 A1   Jul. 2, 2015

(51) Int. Cl.
| | |
|---|---|
| *A01K 79/00* | (2006.01) |
| *A01K 97/00* | (2006.01) |
| *A01K 97/12* | (2006.01) |
| *A01K 93/02* | (2006.01) |
| *A01K 85/01* | (2006.01) |
| *A01K 11/00* | (2006.01) |
| *A01K 85/00* | (2006.01) |

(52) U.S. Cl.
CPC .............. *A01K 85/005* (2013.01); *A01K 11/00* (2013.01); *A01K 11/006* (2013.01); *A01K 11/008* (2013.01); *A01K 79/00* (2013.01); *A01K 85/01* (2013.01); *A01K 93/02* (2013.01); *A01K 97/00* (2013.01); *A01K 97/12* (2013.01)

(58) Field of Classification Search
CPC ....... A01K 79/00; A01K 97/00; A01K 97/12; A01K 85/01; A01K 93/02; A01K 11/00; A01K 11/006; A01K 11/008
USPC ......... 43/4, 17, 42.06, 42.31, 17.1; 340/573.2
See application file for complete search history.

(56) References Cited

U.S. PATENT DOCUMENTS

| | | | | |
|---|---|---|---|---|
| 1,659,129 A | * | 2/1928 | Asaro ................... | A63H 23/10 43/42.06 |
| 1,742,649 A | * | 1/1930 | Eastman ............. | A01K 61/001 40/300 |
| 2,389,719 A | * | 11/1945 | Dinsley .................... | B63C 9/00 43/1 |
| 2,415,742 A | * | 2/1947 | Hiltabidel ............. | A01K 85/01 43/42.06 |
| 2,642,693 A | * | 6/1953 | Broady .................. | A01K 87/00 114/54 |

(Continued)

FOREIGN PATENT DOCUMENTS

| | | |
|---|---|---|
| DE | 102007039285 B4 | 1/2013 |
| WO | WO 2007053774 A1 * | 5/2007 |

(Continued)

*Primary Examiner* — Darren W Ark
(74) *Attorney, Agent, or Firm* — Oblon, McClelland, Maier & Neustadt, L.L.P.

(57) ABSTRACT

A fishing device including a lure body portion, a plurality of pH sensors, a water immersion sensor, a closed rigid container containing pressurized content and connected to the pH sensor, a balloon of a predetermined size, connected to the closed rigid container, a trackable chip configured to provide the location of a caught fish within a predetermined geographical location and a plurality of emitters connected to the sensors and configured to emit different predetermined signals. This device improves fishing by significantly reducing the use of energy and time. Once a fish digests a fishing capsule the pH sensor detects digestions and the water immersion sensor stops detecting water the closed rigid container will be activated, and the pressurized content will inflate the balloon inside the stomach of the fish causing it to float to the surface.

13 Claims, 6 Drawing Sheets

(56) References Cited

U.S. PATENT DOCUMENTS

| | | | | |
|---|---|---|---|---|
| 2,675,776 A * | 4/1954 | Tuve | B63B 51/04 | 114/234 |
| 2,892,198 A * | 6/1959 | Gruenberg | B63B 22/14 | 43/23 |
| 3,128,744 A * | 4/1964 | Jefferts | A01K 11/006 | 119/215 |
| 3,144,017 A * | 8/1964 | Muth | A61B 5/07 | 455/128 |
| 3,170,438 A * | 2/1965 | Nadler | B63B 22/24 | 116/211 |
| 3,216,411 A * | 11/1965 | Watanuki | A61B 5/07 | 600/302 |
| 3,246,417 A * | 4/1966 | Esplin | A01K 91/02 | 43/43.14 |
| 3,280,549 A * | 10/1966 | Hsu | B63C 9/20 | 116/211 |
| 3,313,301 A * | 4/1967 | Jefferts | A01K 61/001 | 119/215 |
| 3,496,906 A * | 2/1970 | Gerke | B63C 7/26 | 116/211 |
| 3,545,405 A * | 12/1970 | Jefferts | A01K 11/006 | 119/215 |
| 3,676,779 A * | 7/1972 | Faulring | H04B 1/034 | 116/203 |
| 3,698,121 A * | 10/1972 | Nordeen | A01K 93/02 | 43/43.14 |
| 3,715,828 A * | 2/1973 | Johnson et al. | A01K 81/00 | 43/6 |
| 3,735,723 A * | 5/1973 | Lutz | G08B 5/002 | 116/210 |
| 3,746,285 A * | 7/1973 | Mango | B64B 1/62 | 116/210 |
| 3,820,545 A * | 6/1974 | Jefferts | A01K 11/006 | 119/215 |
| 3,881,531 A * | 5/1975 | Rossi | B64B 1/50 | 116/210 |
| 3,941,079 A * | 3/1976 | McNeill | B64B 1/50 | 116/210 |
| 4,034,693 A * | 7/1977 | Challenger | A01K 69/08 | 114/333 |
| 4,048,565 A * | 9/1977 | Rice, Sr. | H04B 1/034 | 244/33 |
| 4,307,605 A * | 12/1981 | Niskin | G01P 13/04 | 73/170.07 |
| 4,392,236 A * | 7/1983 | Sandstrom | A01K 61/001 | 119/215 |
| 4,433,638 A * | 2/1984 | Ashline | G08B 5/002 | 116/210 |
| 4,596,085 A * | 6/1986 | Cotillier | A01K 97/02 | 43/17 |
| 4,648,194 A * | 3/1987 | Carroll, Jr. | A01K 91/02 | 43/19 |
| 4,653,219 A * | 3/1987 | Kaupert | A01K 91/06 | 114/311 |
| 4,750,490 A * | 6/1988 | Haw | A01K 61/001 | 119/215 |
| 4,753,031 A * | 6/1988 | Owen | A01K 97/00 | 177/245 |
| 4,790,090 A * | 12/1988 | Sharber | G09F 3/00 | 119/215 |
| 4,794,720 A * | 1/1989 | Robertaccio | A01K 85/00 | 43/42 |
| 4,839,675 A * | 6/1989 | Owen | A01K 97/00 | 177/245 |
| 4,850,128 A * | 7/1989 | Cotillier, Sr. | A01K 79/00 | 116/210 |
| 4,899,480 A * | 2/1990 | Park | G01K 1/024 | 374/136 |
| 4,933,187 A * | 6/1990 | Schneider | A01N 25/26 | 424/462 |
| 4,940,245 A * | 7/1990 | Bittle, Jr. | A01M 31/00 | 342/386 |
| 4,970,988 A * | 11/1990 | Heisey | A01K 79/00 | 119/215 |
| 4,976,442 A * | 12/1990 | Treadway | F42B 12/385 | 473/570 |
| 5,167,417 A * | 12/1992 | Stacey | F42B 12/385 | 473/570 |
| 5,188,373 A * | 2/1993 | Ferguson | F42B 12/385 | 473/578 |
| 5,205,062 A * | 4/1993 | Zimmerman | A01K 85/005 | 43/42.02 |
| 5,222,320 A * | 6/1993 | Erickson | A01K 85/00 | 43/42.32 |
| 5,233,781 A * | 8/1993 | Bigelow | A01K 93/00 | 43/17 |
| 5,324,940 A * | 6/1994 | Ekstrom | A01K 11/00 | 119/215 |
| 5,333,881 A * | 8/1994 | Cugliari | F42B 6/04 | 473/578 |
| 5,407,679 A * | 4/1995 | Hayes | A62B 99/00 | 2/2.15 |
| 5,446,467 A * | 8/1995 | Willett | F42B 6/04 | 342/386 |
| 5,483,767 A * | 1/1996 | Langer | A01K 79/02 | 43/4 |
| 5,511,335 A * | 4/1996 | Langer | A01K 79/02 | 43/17.1 |
| 5,546,695 A * | 8/1996 | Langer | A01K 79/02 | 43/44.98 |
| 5,581,930 A * | 12/1996 | Langer | A01K 79/02 | 43/17 |
| 5,616,333 A * | 4/1997 | Hayes | A62B 99/00 | 2/2.15 |
| 5,634,432 A * | 6/1997 | O'Grady | A01K 11/007 | 119/174 |
| 5,651,210 A * | 7/1997 | Moore | A01K 93/00 | 43/4.5 |
| 5,732,500 A * | 3/1998 | Fitzpatrick | A01K 87/06 | 43/2 |
| 5,761,843 A * | 6/1998 | Lynch | A01K 61/001 | 43/4.5 |
| 5,782,033 A * | 7/1998 | Park | A01K 97/125 | 43/17 |
| 5,857,881 A * | 1/1999 | Zippel, Sr. | B63C 9/15 | 43/25 |
| 5,912,029 A * | 6/1999 | Spickelmire | A01K 85/01 | 424/405 |
| 6,032,607 A * | 3/2000 | Ashline | B63C 7/26 | 116/210 |
| 6,044,582 A * | 4/2000 | Johnson | A01K 61/001 | 223/103 |
| 6,055,761 A * | 5/2000 | Chaprales | A01K 61/001 | 43/6 |
| 6,195,039 B1 * | 2/2001 | Glass, Jr. | B63C 9/0005 | 342/357.75 |
| 6,266,916 B1 * | 7/2001 | Dugan | A01K 85/00 | 43/42.06 |
| 6,318,020 B1 * | 11/2001 | Mefferd | A01K 85/01 | 43/42.32 |
| 6,332,819 B1 * | 12/2001 | Emmons | A44B 15/005 | 441/1 |
| 6,371,927 B1 * | 4/2002 | Brune | A01K 11/007 | 600/549 |
| 6,581,324 B1 * | 6/2003 | Creeger | A01M 1/00 | 43/131 |
| 6,886,290 B2 * | 5/2005 | Scott | A01K 79/00 | 119/215 |
| 7,114,286 B2 * | 10/2006 | Scott | A01K 79/00 | 43/1 |
| 7,300,367 B1 * | 11/2007 | Andol | F42B 12/385 | 342/385 |
| 7,317,661 B2 * | 1/2008 | Kadota | A01K 61/006 | 367/139 |
| 7,448,157 B2 * | 11/2008 | Glynn | A01K 81/04 | 294/126 |
| 7,487,614 B1 * | 2/2009 | Walker | A01K 69/02 | 43/10 |
| 7,669,360 B2 * | 3/2010 | Davidson | A01K 85/01 | 43/17 |
| 8,186,097 B2 * | 5/2012 | Crawford | A01K 31/001 | 224/103 |

(56) References Cited

U.S. PATENT DOCUMENTS

| | | | | |
|---|---|---|---|---|
| 8,553,501 B1* | 10/2013 | Cota | G01V 1/38 | 367/131 |
| 8,613,241 B2* | 12/2013 | Martinez | B63G 9/04 | 114/382 |
| 8,691,253 B1* | 4/2014 | Tracy | A01N 25/34 | 208/22 |
| 8,756,853 B2* | 6/2014 | Davidson | A01K 85/01 | 340/870.03 |
| 8,919,034 B2* | 12/2014 | Alhuwaishel | A01K 69/06 | 43/100 |
| 8,950,107 B1* | 2/2015 | Rosenbloom | A01K 95/02 | 43/44.87 |
| 9,095,122 B2* | 8/2015 | Allen | A01K 61/001 | |
| 2005/0223618 A1* | 10/2005 | Mueller | A01K 85/01 | 43/26.2 |
| 2007/0180756 A1* | 8/2007 | McHone | A01K 85/02 | 43/26.2 |
| 2008/0000140 A1* | 1/2008 | Mitchell | A01K 85/16 | 43/42.06 |
| 2008/0202014 A1* | 8/2008 | Palermo | A01K 85/01 | 43/26.2 |
| 2008/0271362 A1* | 11/2008 | Mikhail | A01K 69/06 | 43/100 |
| 2009/0117172 A1* | 5/2009 | Rogers | A61K 9/0056 | 424/442 |
| 2011/0197493 A1* | 8/2011 | Kwong | A01K 85/01 | 43/42.06 |
| 2012/0144723 A1* | 6/2012 | Davidson | A01K 85/01 | 43/17.6 |
| 2014/0000150 A1* | 1/2014 | Ryu | A01K 85/01 | 43/42.32 |
| 2015/0113853 A1* | 4/2015 | McKeough | A01K 93/02 | 43/17 |
| 2015/0250140 A1* | 9/2015 | Fraser | A01K 29/005 | 340/573.2 |
| 2015/0289479 A1* | 10/2015 | Allen | A01K 61/001 | 367/135 |

FOREIGN PATENT DOCUMENTS

| | | | | |
|---|---|---|---|---|
| WO | WO 2009028680 A1 * | 3/2009 | | G01S 5/18 |
| WO | WO 2010105846 A2 * | 9/2010 | | |
| WO | WO 2011152504 A1 * | 12/2011 | | |
| WO | WO 2015031853 A2 * | 3/2015 | | |

* cited by examiner

FISHING CAPSULES

BACKGROUND OF THE INVENTION

A fishing device can be made of a lure coated capsule, which can be formed into a particular shape and size to safely inflate in a stomach of a fish upon digestion.

GRANT OF NONEXCLUSIVE RIGHT

This application was prepared with financial support from the Saudi Arabian Cultural Mission, and in consideration therefore the present inventor(s) has granted the Kingdom of Saudi Arabia a nonexclusive right to practice the present invention.

SUMMARY

A fishing device including a lure body portion, a plurality of pH sensors, a water immersion sensor, a closed rigid container containing pressurized content and connected to the pH sensor, a balloon of a predetermined size, connected to the closed rigid container, a trackable chip configured to provide the location of a caught fish within a predetermined geographical location and a plurality of emitters connected to the sensors and configured to emit different predetermined signals. This device improves fishing by significantly reducing the use of energy and time. Once a fish digests a fishing capsule the pH sensor detects digestions and the water immersion sensor stops detecting water the closed rigid container will be activated, and the pressurized content will inflate the balloon inside the stomach of the fish causing it to float to the surface.

DETAILED DESCRIPTION OF THE EMBODIMENTS

Figure 1:
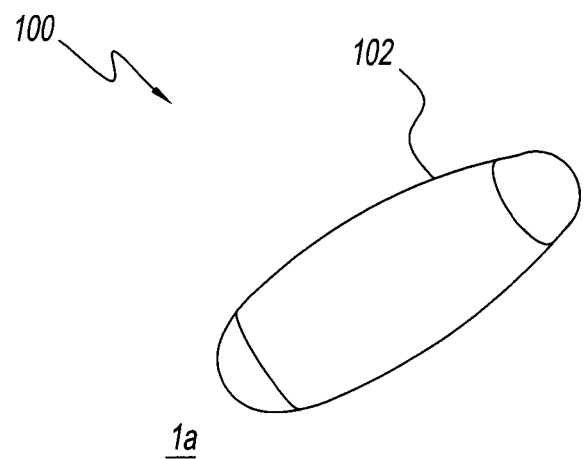
FIG. 1*a* is a perspective view of the fishing device that is in the shape of a capsule.
FIG. 1*b* is a perspective view of the fishing capsule coated by a lure body portion.
Figure 1:
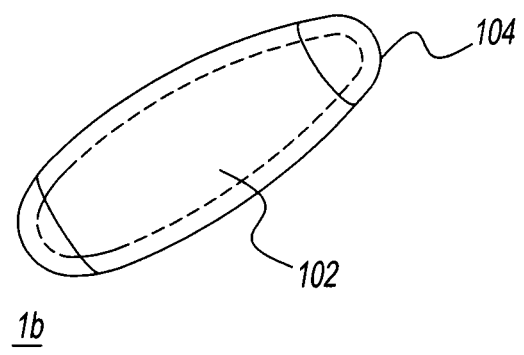

Referring now to the drawings, wherein like reference numerals designate identical or corresponding parts throughout the several views, FIG. 1A shows a fishing device in the shape of the capsule 102. The fishing capsule 102 may be made of one or a combination of metal, polymer and ceramic material, but this is not limiting. The metal maybe of ferrous and non-ferrous metals for example, a stainless steel, titanium and alloys thereof and mixtures thereof. The Polymer maybe thermoplastic or thermostat material for example, polyolefin, polycarbonate, polylactade and alloys thereof and mixtures thereof. The ceramic material maybe inorganic oxides of metals and elements including but not limited to the transition metals, the main group metals and the alkaline earth metals. FIG. 1B shows the fishing capsule 102 with a lure coating layer 104. The fishing capsule 102 is a capsule that is used to improve the process of fishing, saves both energy and time and performs better fish attracting skills. The fishing capsule 102 is made of a thermochromism material, which allows it to reversibly change color with temperature, catching the attention of more fish.

FIG. 2A is a schematic of an inflating system 200 that is located inside of the capsule 102, including a closed rigid container 202 that is in the shape of a cylinder, in order to fit inside of the capsule 102. The closed rigid container 202 contains a pressurized content (e.g., a pressurized fluid, gas, liquid, mixture thereof or chemical composition) 206 (e.g. $CO_2$) that is controlled by two pressure meters 204 located at both ends of the cylinder. The closed rigid container 202, may release its content 206, via two ports located at both ends of the closed rigid container 202. One of the ports 210 is a connection port and is only used in the implementation where two capsules 102 are connected to each other. The second port 212, is a one way port that allows the pressurized content 206 to flow from the closed rigid container 202 and into the collapsed and/or folded balloon 208 only. The balloon 208, may be of different colors and or numbers, this feature will allow the capsules to be user specific, to avoid any confusion in the situation where more than one user are fishing in the same location.

FIG. 2B is a schematic showing the pressurized content 206 being released from the closed rigid container 202 and through the one way port 212 into the folded balloon 208 while being controlled by the pressure meter 204. The pressure meter 204 is used to measure the pressure inside the balloon in comparison to the pressure in the stomach of the fish, so that when it reaches a predetermined threshold the one way port 212 is closed and the pressurized contents flow is stopped, so the size of the balloon is just enough to fill the fish's stomach and choke it without damaging the fish's body.

Figure 2:
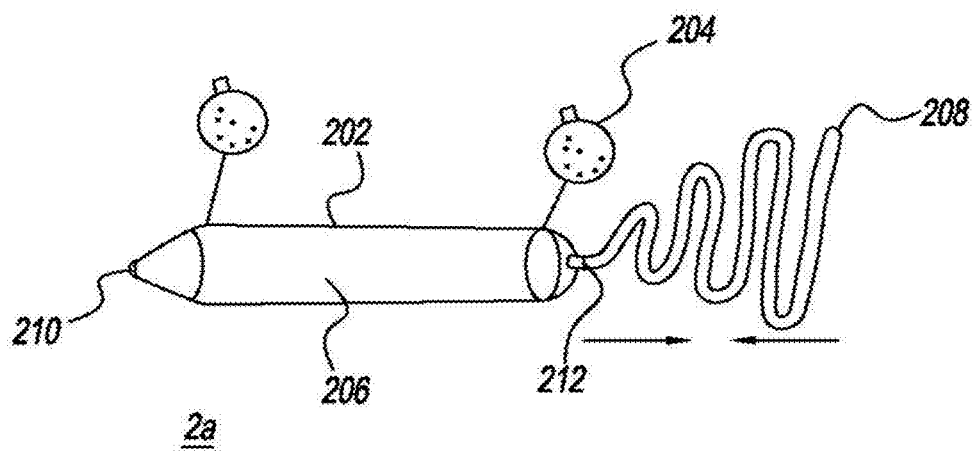
FIG. 2*a* is a schematic of an inflating system including a closed rigid container is connected to a folded balloon.
FIG. 2*b* is a schematic showing the system mentioned in FIG. 2A while a pressurized content of the closed rigid container is released into the balloon and the balloon is inflated.
Figure 3:
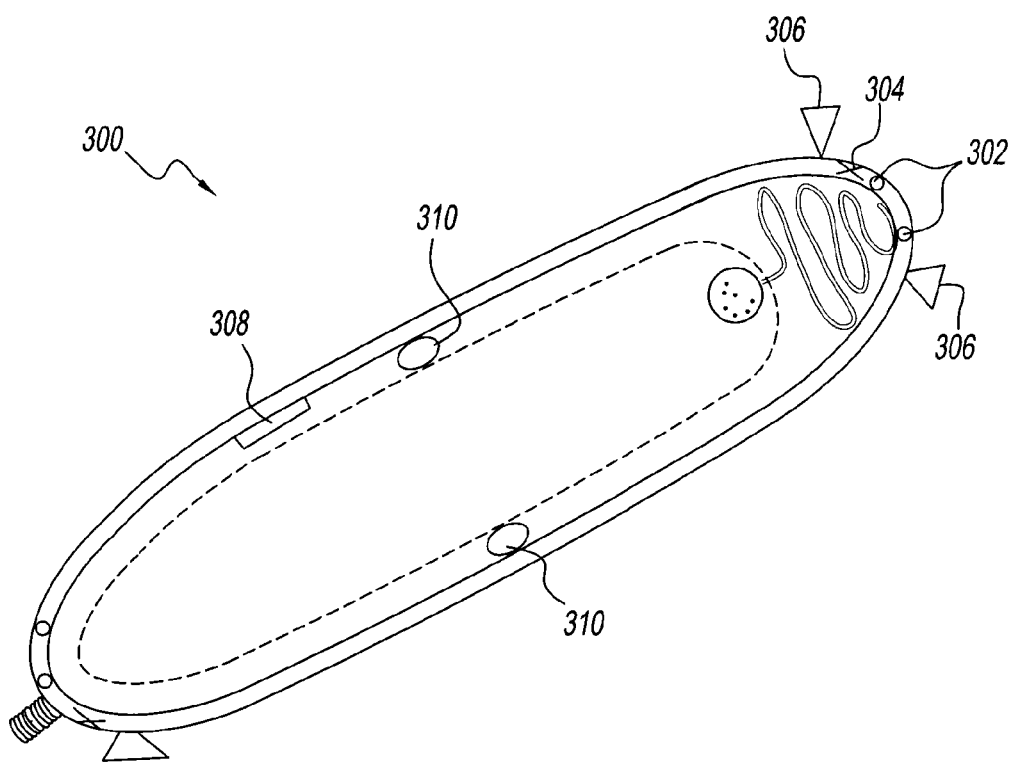
FIG. 3 is a perspective view of the fishing capsule including emitters, water sensors, PH sensors, a trackable chip, and an air bubble of a predetermined size.

FIG. 3 is a perspective view of a fishing device 300, the fishing device 300 includes the inflation system shown in FIG. 2, as well as pH sensors 302, water sensors 304, multiple emitters 306, a trackable chip 308 and an air bubble of a predetermined size 310. Once the capsule is thrown into the water, the air bubble of predetermined size 310 causes the capsule 102 to float mid-water so it is easier for fish to find. This also helps to avoid wasting capsules by preventing them from getting stuck in sand or rocks, depending on the targeted fish the user can activate the multiple emitters 306 to emit light or sound or both prior to throwing the capsule in water. In another implementation, the multiple emitters 306 can be connected to the sensors 302, 304 such that the multiple emitters 306 are activated once the water sensor 304 detects that the capsule 102 is in water. Using either a predetermined frequency of sound waves, or a predetermined intensity of light or both can attract different fish more efficiently.

Figure 4:
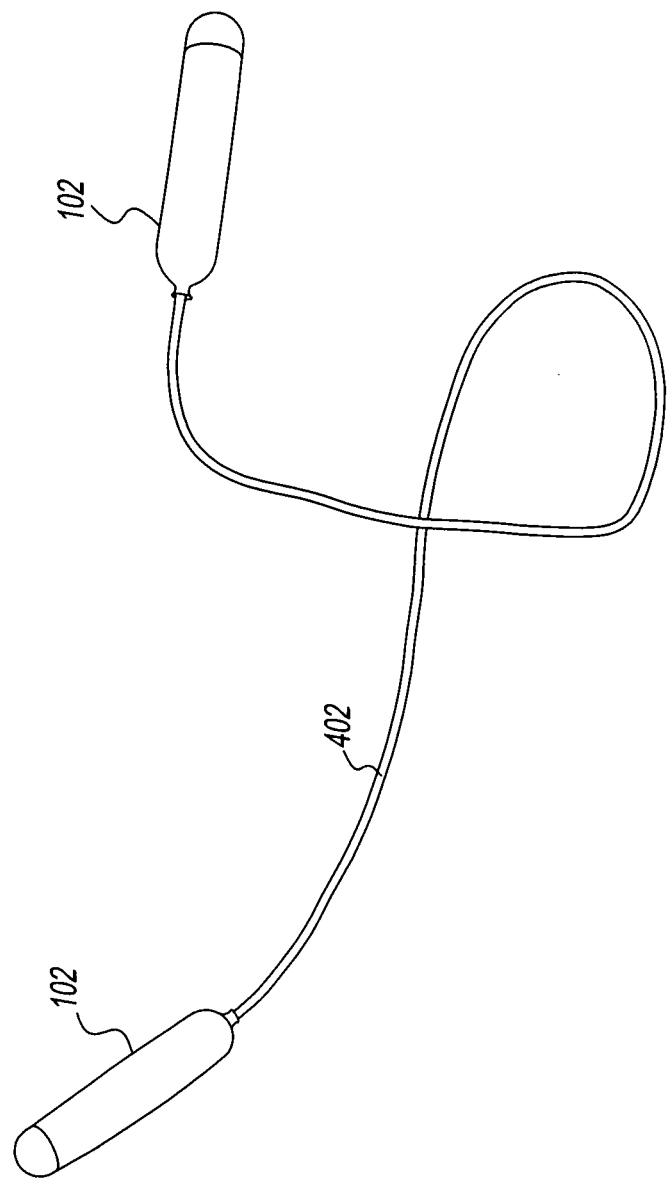
FIG. 4 is a schematic of one embodiment of the fishing device where two fishing capsules are connected to each other via a flexible tube.

FIG. 4 is a schematic of one embodiment of the fishing device 300, where two fishing capsules 102 are connected to each other via the connection ports 210 on each of them by a flexible connection tube 402. In this embodiment, two capsules 102 are connected to each other via the connection ports on each of the two ends, using a flexible connection tube 402 and are then thrown into the water.

In one implementation of this embodiment, a targeted fish is attracted to the lure body portion 104 coating the capsule 102 and eats and/or ingests it, as soon as the capsule 102 reaches the stomach of the fish, the pH level of the capsule's surroundings change, once the pH sensors 302 detect the change in the pH level and the water sensors lose any detection of water (to make sure the whole capsule was swallowed), the closed rigid container 202 is activated to release its pressurized content 206 through the one way port 212 into the folded balloon 208 while the pressure meter 204 is controlling the size of the inflation based on the size of the stomach of the fish by measuring the pressure of the balloon in comparison to the pressure of the fish's stomach. As soon as the pressure meter 204 determines a threshold, the connection port 210 is opened to allow the pressurized content 206 to flow through the flexible connection tube 404 and through the connection port 210 of the second capsule into the second fishing capsule activating the balloon inflation system 200 in that capsule, at which point the first capsule has inflated the balloon inside the stomach of the fish and the second capsule has inflated the balloon into the water, in order to act as a flotation device.

In another implementation of this embodiment, two fishes may approach both ends of the flexible connection tube 404, and each eats the capsule at its end, at which point as soon as the pH sensors detect the change in the pH level and the water sensors stop sensing water both capsules will inflate inside the stomachs of the fishes, which eventually will lead to the flotation of both fishes. However, it will take a little bit more time, as the fishing device in this case is pulling two fishes to the surface only by the balloons in their stomachs, where in the other implementation a single fish was being pulled to the surface by the balloon in its stomach as well as the support of the free balloon on the other end.

Figure 5:
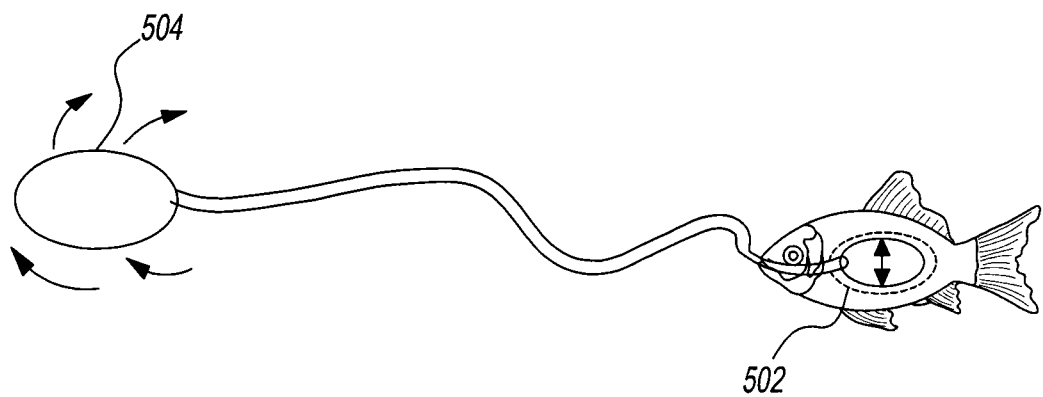
FIG. 5 is a perspective view of a fish biting onto the fishing capsule while the capsule on the other end inflates the balloon and acts as a flotation device.

FIG. 5 is a schematic of a fish eating one capsule and its balloon being inflated according to the size of the fish's stomach 502, while the other capsule inflates to become a full size balloon that will act as a flotation device.

Figure 6:
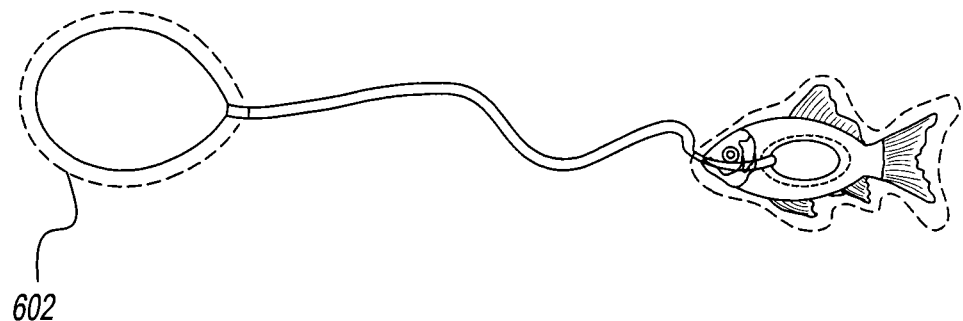
FIG. 6 is a perspective view of the fishing device after a fish is caught and is being pulled to the surface, showing the emitters releasing a repellent odor around the balloon and the caught fish.

FIG. 6 is a schematic showing the fishing capsule's releasing a repellent odor 602 via plurality of emitters 306, in response to an activation of the plurality of pH sensors 302, where a repellent odor will be released from both capsules surrounding both the fish and the balloon that is acting as a flotation device, to prevent any possible predators from approaching the caught fish.

Figure 7:
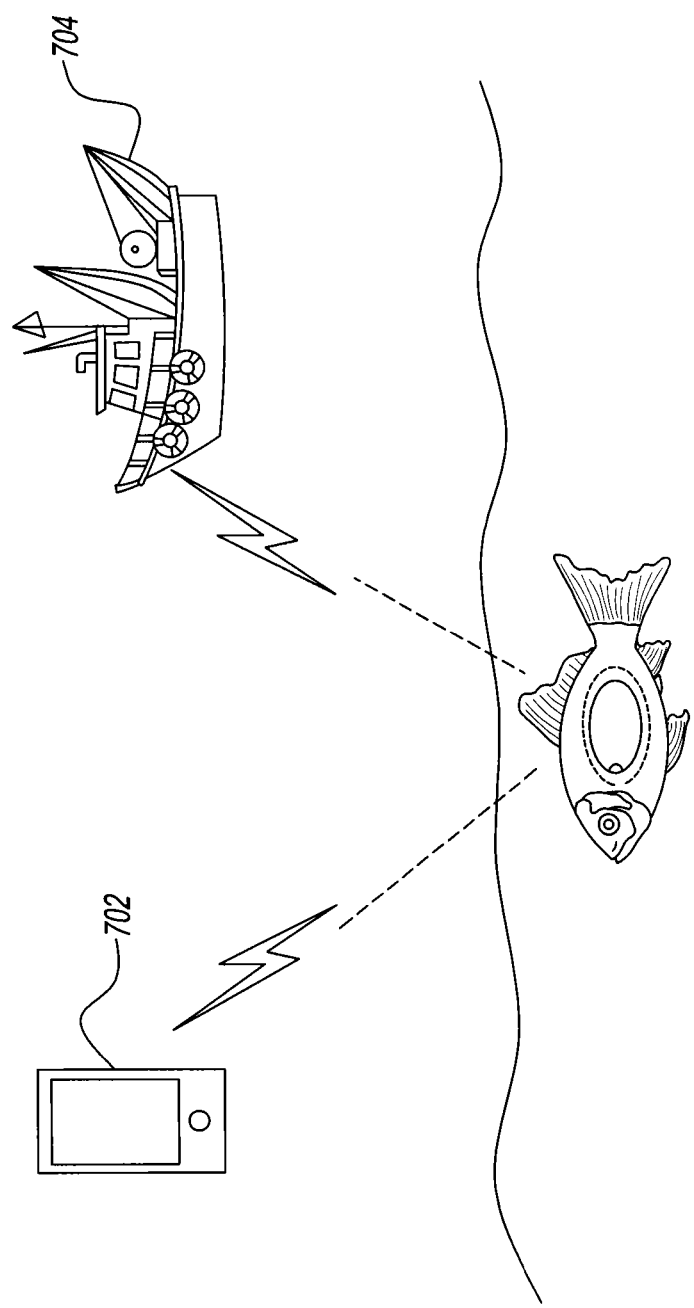
FIG. 7 is a schematic of a tracking method of the fishing capsule where using a smartphone application or a tracking device in a fishing boat, a fishing capsule can be located under water.

FIG. 7 is a schematic of a tracking system 700, where the trackable chip 308 that is located in the capsule can be tracked while under water and inside a fish by a smartphone application 702 or a tracking method in fishing boats 704. The tracking system 700, is used to be able to locate a fish after the balloon has inflated inside of the fish, this will help the user to locate the fish in the case it was able to swim away between the time it ate the capsule and when the balloon was inflated.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A fishing device, comprising:
a lure body portion configured to attract fish;
a plurality of pH sensors configured to detect a pH level within a stomach of a fish;
a sensor configured to detect immersion in water;
a closed rigid container connected to the plurality of pH sensors and configured to release pressurized content therein via a first connection port;
a balloon of a predetermined size, connected to the closed rigid container at the first connection port and configured to be inflated;
a trackable chip configured to provide a location of a caught fish within a predetermined geographical location;
a plurality of emitters connected to the sensors and configured to emit different predetermined signals,
wherein in response to the plurality of pH sensors detecting a predetermined change in pH signaling that the device is ingested by a fish and the sensor configured to detect immersion in water no longer detecting water when the capsule is fully inside the fish, the closed rigid container is activated to release the pressurized content into the balloon.

2. The device according to claim 1, wherein the device is a capsule that can be eaten by fish.

3. The device according to claim 2, wherein the lure body portion is an outer coating of the capsule.

4. The device according to claim 1, wherein the plurality of emitters emit a predetermined frequency of sound waves or a predetermined intensity of light or both once the sensor configured to detect immersion in water detects the capsule is in water.

5. The device according to claim 1, wherein the balloon can only be inflated in the stomach of a fish after the plurality of pH sensors detect the predetermined change in pH and the water sensor loses detection of water.

6. The device according to claim 5, wherein the balloon can be user-identified through a user specific color or number.

7. The device according to claim 5, wherein the plurality of emitters emit, in response to the plurality of pH sensors detecting the predetermined change in pH, a predetermined concentration of repellent odor that prevents other fish from eating the fish which has ingested the device.

8. The device according to claim 7, wherein the plurality of emitters emit a predetermined frequency of sound waves in response to the sensor configured to detect immersion in water detecting that the capsule is in water.

9. The device according to claim 8, wherein the fishing device further includes at least one pressure sensor configured to control a flow of the pressurized content as a function of a comparison of a pressure inside of the balloon to a pressure in the stomach of the fish.

10. The device according to claim 8, wherein the rigid container further includes a second connection port which connects to another fishing device via a connection tube.

11. The device according to claim 1, wherein the lure body portion is further configured to change color with water temperature to attract different kinds of fish.

12. The device according to claim 1, further comprising: an air bubble configured to allow the device to float in water until eaten by a fish.

13. The device according to claim 1, wherein the fishing device further includes at least one pressure sensor configured to control a flow of the pressurized content as a function of a comparison of a pressure inside of the balloon to a pressure in the stomach of the fish.

* * * * *